(12) United States Patent
Sethi et al.

(10) Patent No.: US 11,023,222 B1
(45) Date of Patent: Jun. 1, 2021

(54) GENERATING SOFTWARE UPDATE NOTIFICATIONS WITH CUSTOMIZED NUMBERS OF DEFERRALS

(71) Applicant: Dell Products L.P., Round Rock, TX (US)

(72) Inventors: Parminder Singh Sethi, Ludhiana (IN); Aarsi Kumar, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/898,605

(22) Filed: Jun. 11, 2020

(51) Int. Cl.
| | |
|---|---|
| *G06F 9/44* | (2018.01) |
| *G06F 8/65* | (2018.01) |
| *G06F 8/77* | (2018.01) |
| *G06F 11/30* | (2006.01) |
| *G06F 9/451* | (2018.01) |
| *G06F 9/54* | (2006.01) |

(52) U.S. Cl.
CPC ............. *G06F 8/65* (2013.01); *G06F 8/77* (2013.01); *G06F 9/451* (2018.02); *G06F 9/542* (2013.01); *G06F 11/302* (2013.01)

(58) Field of Classification Search
CPC ... G06F 8/65; G06F 9/451; G06F 8/77; G06F 9/542; G06F 11/302
USPC .................................................. 717/168–178
See application file for complete search history.

(56) References Cited

U.S. PATENT DOCUMENTS

| | | |
|---|---|---|
| 2009/0300596 A1 | 12/2009 | Tyhurst et al. |
| 2012/0204171 A1 | 8/2012 | Reisman |
| 2014/0237466 A1* | 8/2014 | Motta .................. G06F 8/65 717/173 |

OTHER PUBLICATIONS

Dell Inc. "Dell SupportAssist for PCs and Tablets User's Guide," Jun. 2015, 14 pages.
Dell EMC, "SupportAssist for Enterprise Systems," Accessed Jun. 2020, 8 pages.
Dell EMC, "SupportAssist for Enterprise Systems," Jul. 2018, 2 pages.
Dell Inc. "Dell SupportAssist for Client Systems," Jul. 2016, 2 pages.

* cited by examiner

*Primary Examiner* — Chuck O Kendall
(74) *Attorney, Agent, or Firm* — Ryan, Mason & Lewis, LLP

(57) ABSTRACT

An apparatus comprises a processing device configured to identify software updates available for software applications installed on a computing resource, at least a given one of the software updates for a given one of the software applications comprising information characterizing features of the given software application affected by the given software update. The processing device is also configured to determine frequencies of usage of the features of the given software application, and to select a number of allowable deferrals for the given software update based at least in part on the information characterizing the features of the given software application affected by the given software update and the determined frequencies of usage. The processing device is further configured to generate a software update notification for the given software update comprising an indication of a remaining number of the allowable deferrals for the given software update.

20 Claims, 14 Drawing Sheets

GENERATING SOFTWARE UPDATE NOTIFICATIONS WITH CUSTOMIZED NUMBERS OF DEFERRALS

FIELD

The field relates generally to information processing, and more particularly to techniques for managing software applications.

BACKGROUND

Software applications installed on computing resources may be periodically updated by software vendors or other providers of the software applications. When a software update is made available for a software application installed on a particular computing resource, a software update notification may be provided on that computing resource indicating the software application to be updated. The software update notification may also include various user interface features for controlling how and whether to apply the software update. Such user interface features may include, for example, selectable buttons allowing a user to continue with applying the software update or to defer application of the software update.

SUMMARY

Illustrative embodiments of the present invention provide techniques for generating software update notifications with customized numbers of deferrals.

In one embodiment, an apparatus comprises at least one processing device comprising a processor coupled to a memory. The at least one processing device is configured to perform the step of identifying one or more software updates available for one or more software applications installed on a computing resource, at least a given one of the one or more software updates for a given one of the one or more software applications comprising information characterizing one or more features of the given software application affected by the given software update. The at least one processing device is also configured to perform the steps of determining one or more frequencies of usage of the one or more features of the given software application affected by the given software update, and selecting a number of allowable deferrals for the given software update based at least in part on the information characterizing the one or more features of the given software application affected by the given software update and the determined one or more frequencies of usage of the one or more features of the given software application affected by the given software update. The at least one processing device is further configured to perform the step of generating a software update notification for the given software update, the given software update notification comprising an indication of a remaining number of deferrals for the given software update, the remaining number of deferrals comprising a difference between the selected number of allowable deferrals for the given software update and a number of previously-used deferrals for the given software update.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
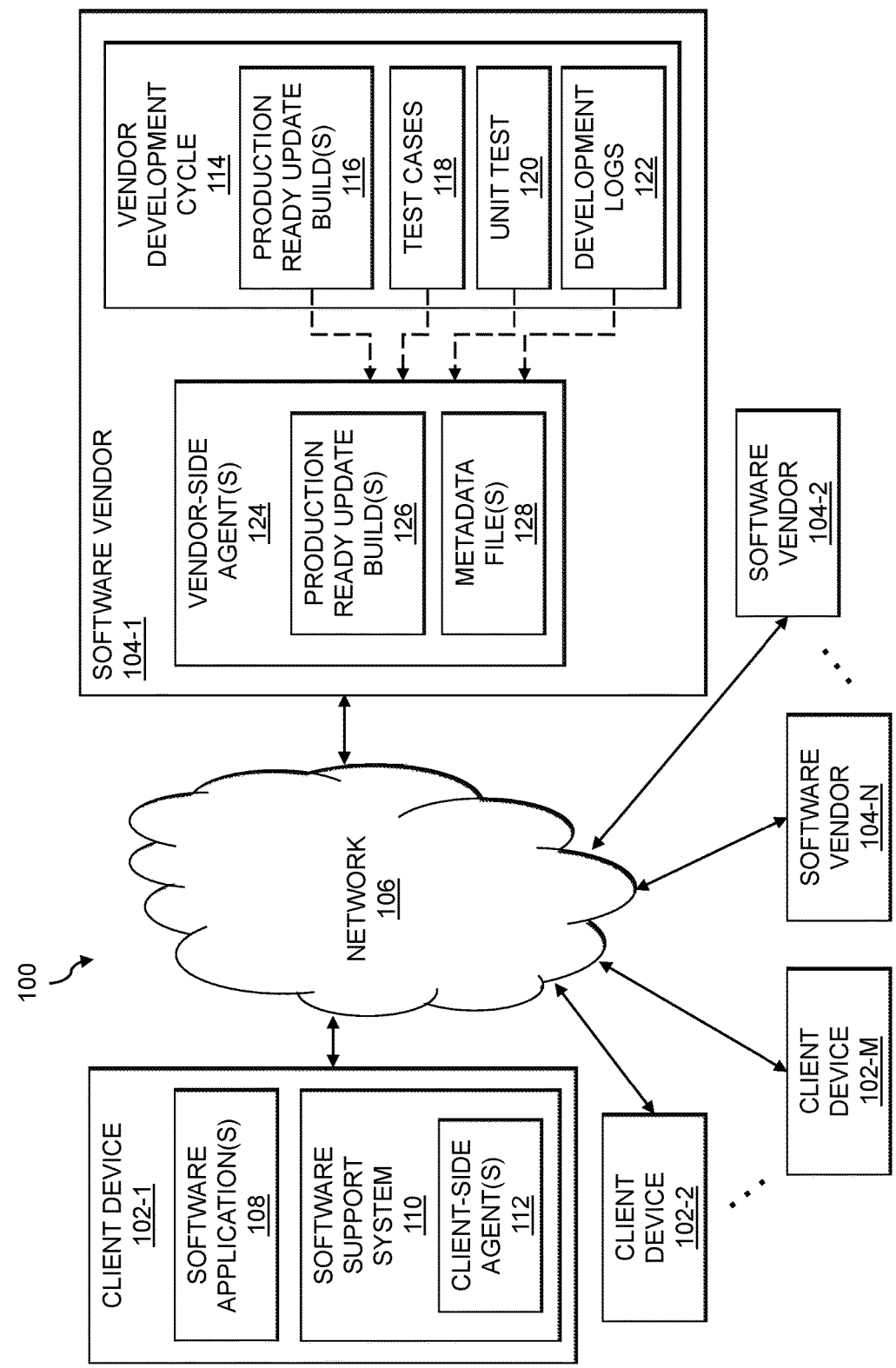
FIG. 1 is a block diagram of an information processing system configured for generating software update notifications with customized numbers of deferrals in an illustrative embodiment of the invention.

FIG. 1 shows an information processing system 100 configured in accordance with an illustrative embodiment. The information processing system 100 is assumed to be built on at least one processing platform and provides functionality for generating software update notifications with customized numbers of deferrals. The information processing system 100 includes a set of client devices 102-1, 102-2, ... 102-M (collectively, client devices 102) that are coupled to a set of software vendors 104-1, 104-2, ... 104-N (collectively, software vendors 104) via a network 106.

The client devices 102 are assumed to have various software applications installed therein. For example, client device 102-1 is shown with installed software applications 108. It should be appreciated that the software applications 108 may include an operating system (OS) of the client device 102-1 or at least a portion thereof. The software applications 108 may also or alternatively include other types of software applications or programs that are installed or run within the OS of the client device 102-1. The software applications 108 may also or alternatively include applications that run in accordance with a client-server computer program architecture, such as web applications designed for delivery to users of the client devices 102 over the network 106 (e.g., from the software vendors 104, from application servers, etc.). Web applications are an example of applications that run in accordance with a client-server computer program architecture. It should therefore be appreciated that the term "software application" as used herein is intended to be broadly construed to include the aforementioned and other types of software applications, as well as combinations of the aforementioned types of software applications.

The client devices 102 may comprise respective compute resources, which may include physical and virtual computing resources of an information technology (IT) infrastructure. Physical computing resources may include physical hardware such as servers, storage systems, networking equipment, Internet of Things (IoT) devices, other types of processing and computing devices, etc. Virtual computing resources may include virtual machines (VMs), software containers, etc.

In some embodiments, client devices 102 are assumed to comprise physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, software containers, etc.

The client devices 102 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The client devices 102 are assumed to comprise respective software support systems that manage the installing of at least some of the software applications installed thereon. FIG. 1, for example, shows client device 102-1 including software support system 110 that manages the software applications 108 installed thereon. The software support system 110 may be one of many software support systems that run on the client device 102-1. For example, in some embodiments the client device 102-1 may run separate software support systems for managing software updates from different ones of the software vendors 104. In other embodiments, a single software support system manages software updates from multiple ones of the software vendors 104. In the description below, it is assumed that the software support system 110 is at least configured to manage software updates provided by the software vendor 104-1.

The software support system 110 of client device 102-1 is also shown including one or more client-side agents 112. The client-side agents 112 are assumed to provide functionality for monitoring usage of the software applications 108 on the client device 102-1. Such information is utilized to select the number of deferrals to be utilized for software updates provided by the software vendors 104 as will be described in further detail below. The software support system 110 is assumed to generate software update notifications that allow for deferring application or installation of software updates, with the particular number of deferrals allowed being customized based at least in part on the features of software applications that are affected by the software updates (e.g., which information is captured via software update metadata files 128 described in further detail below) and the frequency of usage of such features of the software applications that are affected by the software updates. The generated software update notifications may be presented by the software support system 110 to one or more users of the client device 102-1, to one or more users responsible for managing the client device 102-1 (e.g., such as an IT administrator or other type of authorized user that controls or otherwise manages installing of software updates for the client devices 102).

Although shown as internal to the software support system 110 in FIG. 1, it should be appreciated that one or more of the client-side agents 112 may be implemented at least in part external to the software support system 110. In some cases, one or more of the client-side agents 112 may be implemented at least in part within or in association with ones of the software applications 108 that they monitor. Other ones of the client devices 102-2 through 102-M are assumed to be configured in a manner similar to that described with respect to client device 102-1 with respective software applications installed thereon as well as software support systems and client-side agents.

The software vendors 104, which may also be referred to herein as software providers, are assumed to be the source of the software applications installed on the client devices 102. For example, software vendor 104-1 is assumed to provide one or more of the software applications 108 that run on client device 102-1. Each of the software vendors 104 is assumed to comprise or be associated with a software development and deployment cycle. FIG. 1 shows, for example, the software vendor 104-1 including vendor development cycle 114. The vendor development cycle 114 may include various production ready update builds 116 for different software applications that are provided or managed by the software vendor 104-1. The vendor development cycle 114 may also include test cases 118, unit test 120, and various logs 122 generated during software development.

The software vendor 104-1 is also shown including one or more vendor-side agents 124. The vendor-side agents 124 are configured to provide software update to the client devices 102, where the software updates include one or more production ready update builds 126 and associated software update metadata files 128. The vendor-side agents 124 are assumed to collect information regarding the production ready update builds 126 from the vendor development cycle 114, where such information characterizes the changes in the production ready update builds 126 that form a particular software update. The information characterizing the changes may include information regarding impacted and un-impacted features of software applications being updated. Other ones of the software vendors 104-2 through 104-N are assumed to be configured in a manner similar to that described with respect to software vendor 104-1 with respective vendor development cycles and vendor-side agents 124.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

Although not shown in FIG. 1, one or more of the client devices 102 and software vendors 104 may comprise or otherwise be associated with one or more databases or other data stores that maintain information regarding installed software applications and their usage, change information for software updates, etc. Such databases or other data stores may be implemented using one or more storage systems or devices associated with the client devices 102 and/or software vendors 104. In some embodiments, one or more storage systems may comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102 and/or software vendors 104, as well as to support communication between the client devices 102 and software vendors 104 and other related systems and devices not explicitly shown.

The software applications installed on the client devices 102 are assumed to be utilized by various different users. The term "user" herein is intended to be broadly construed so as to encompass numerous arrangements of human, hardware, software or firmware entities, as well as combinations of such entities.

In some embodiments, software update alerts or notifications generated by the software support system 110 are provided to users of the client device 102-1, or to a system administrator, IT manager, or other authorized personnel via one or more host agents. Such host agents may be implemented via the client device 102-1 or by other computing or processing devices associated with a system administrator, IT manager or other authorized personnel that manages the client device 102-1 (and possibly other ones of the client devices 102). Such devices can illustratively comprise mobile telephones, laptop computers, tablet computers, desktop computers, or other types of computers or processing devices configured for communication over network 106 with the client devices 102. For example, a given host agent may comprise a mobile telephone equipped with a mobile application configured to receive alerts or notifications from the software support system 110 (e.g., when new software updates are available). The given host agent provides an interface for responding to such various alerts or notifications, such as by selecting whether to defer or install the software updates, as described elsewhere herein.

It should be noted that a "host agent" as this term is generally used herein may comprise an automated entity, such as a software entity running on a processing device. Accordingly, a host agent need not be a human entity.

The client devices 102 and software vendors 104 in the FIG. 1 embodiment are assumed to be implemented using at least one processing device. Each such processing device generally comprises at least one processor and an associated memory, and implements one or more functional modules for controlling certain features of the client devices 102 and software vendors 104, such as software support system 110, client-side agents 112, vendor-side agents 124, etc. At least portions of the software support system 110, client-side agents 112, vendor-side agents 124 and other components of the information processing system 100 may be implemented at least in part in the form of software that is stored in memory and executed by processors of such processing devices.

It is to be appreciated that the particular arrangement of the client devices 102 and software vendors 104 illustrated in the FIG. 1 embodiment is presented by way of example only, and alternative arrangements can be used in other embodiments. For example, the software support system 110, or one or more portions thereof such as the client-side agents 112, may be implemented at least in part external to the client device 102-1. For example, the software support system 110 may be run on a separate client device or server that manages software updates for one or more of the client devices 102 including the client device 102-1.

It is to be understood that the particular set of elements shown in FIG. 1 for generating software update notifications with customized numbers of deferrals is presented by way of illustrative example only, and in other embodiments additional or alternative elements may be used. Thus, another embodiment may include additional or alternative systems, devices and other network entities, as well as different arrangements of modules and other components.

One or more of the client devices 102 and/or software vendors 104, in some embodiments, may be part of cloud infrastructure as will be described in further detail below.

The client devices 102, software vendors 104 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 102 and software vendors 104, or components thereof, may be implemented on respective distinct processing platforms, although numerous other arrangements are possible. For example, in some embodiments at least portions of the client devices 102 and software vendors 104 are implemented on the same processing platform. A given client device (e.g., 102-1) can therefore be implemented at least in part within at least one processing platform that implements at least a portion of a given software vendor (e.g., 104-1).

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102 and software vendors 104, or portions or components thereof, to reside in different data centers. Numerous other distributed implementations are possible. The client devices 102 and software vendors 104 can also be implemented in a distributed manner across multiple data centers.

Additional examples of processing platforms utilized to implement portions of the information process system 100 of FIG. 1 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for generating software update notifications with customized numbers of deferrals will now be described in more detail with reference to the flow diagram of FIG. 2. It is to be understood that this particular process is only an example, and that additional or alternative processes for generating software update notifications with customized numbers of deferrals can be carried out in other embodiments.

In this embodiment, the process includes steps 200 through 206. These steps are assumed to be performed at least in part by the software support system 110 of client device 102-1 utilizing the client-side agents 112. The process begins with step 200, identifying one or more software updates available for one or more software applications (e.g., software applications 108) installed on a computing resource (e.g., the client device 102-1). At least a given one of the one or more software updates for a given one of the one or more software applications comprises information characterizing one or more features of the given software application affected by the given software update. Such information may be part of one or more metadata files (e.g., software update metadata files 128) provided as part of the software update from a software vendor (e.g., software vendor 104-1) to the computing resource having installed thereon the software to be updated. The information characterizing the one or more features of the given software application affected by the given software update may comprise information identifying at least one of one or more newly-added features for the given software application, one or more existing features of the given software application modified by the given software update, and one or more existing features of the given software application deleted by the given software update.

In step 202, one or more frequencies of usage of the one or more features of the given software application affected by the given software update are determined. Step 202 may utilize thin client agents (e.g., client-side agents 112) that collect logs produced by the software applications that are to be updated. In some embodiments, step 202 comprises analyzing usage of the given software application by the computing resource (e.g., by client device 102-1), by one or more users of the computing resource, or by one or more users of the computing resource and one or more additional computing resources (e.g., analyzing usage by the client devices 102 collectively, or by one or more users that utilize the given software application on multiple ones of the client devices 102).

Figure 2:
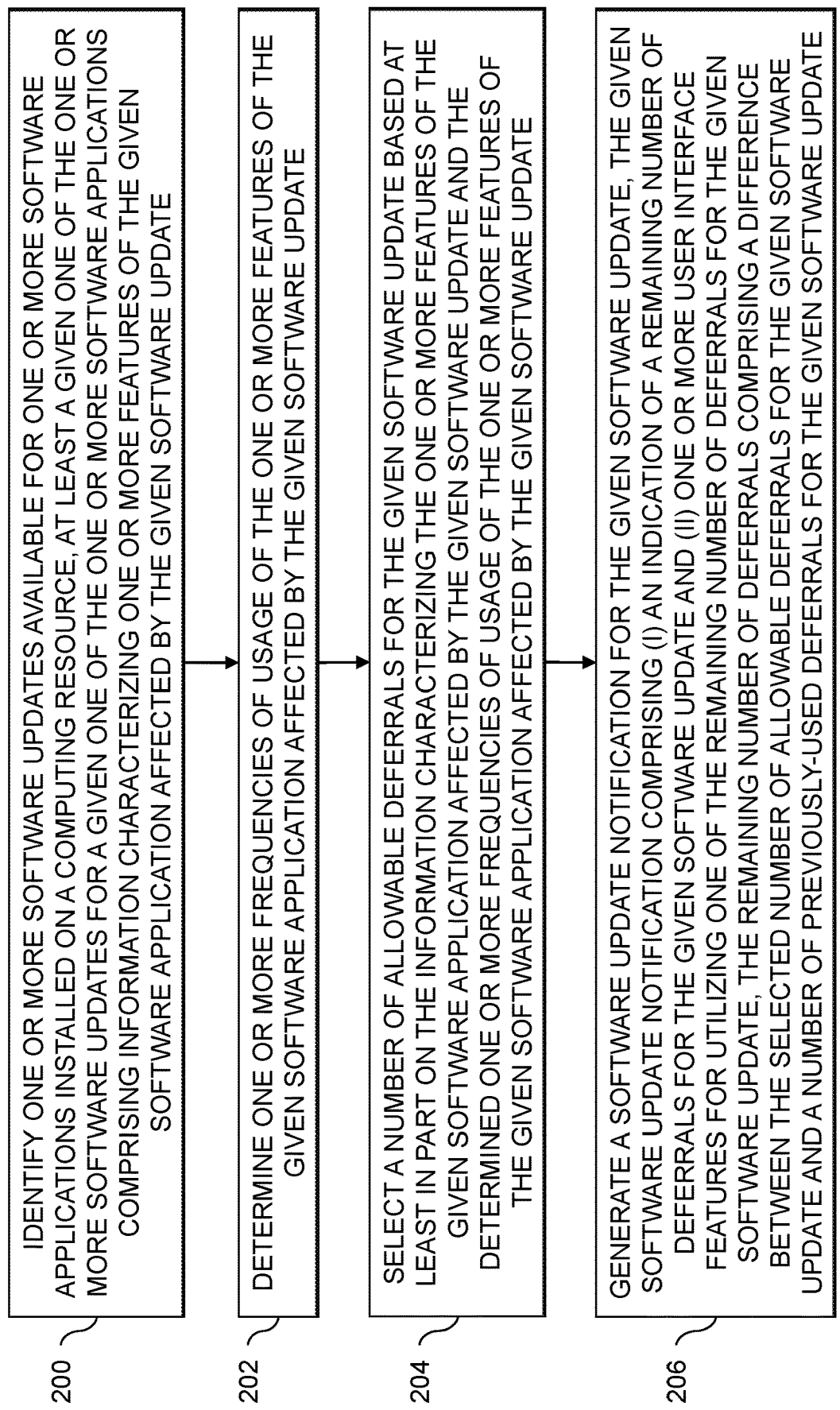
FIG. 2 is a flow diagram of an exemplary process for generating software update notifications with customized numbers of deferrals in an illustrative embodiment.

The FIG. 2 process continues with step 204, selecting a number of allowable deferrals for the given software update based at least in part on the information characterizing the one or more features of the given software application affected by the given software update and the determined one or more frequencies of usage of the one or more features of the given software application affected by the given software update. Step 204 in some embodiments includes selecting from amongst a set of two or more frequency buckets each associated with a different number of allowable deferrals. A given number of allowable deferrals associated with a given one of the set of two or more frequency buckets may be based at least in part on a maximum number of allowable deferrals specified by a software vendor providing the given software update for the given software application. Each of the set of two or more frequency buckets may be associated with a different frequency usage range.

Selecting from amongst the set of two or more frequency buckets may comprise mapping the determined one or more frequencies of usage of the one or more features of the given software application affected by the given software update to one of the set of two or more frequency buckets. Mapping the determined one or more frequencies of usage of the one or more features of the given software application affected by the given software update to one of the set of frequency buckets may comprise computing an average of the determined one or more frequencies of usage of the one or more features of the given software application affected by the given software update and selecting a given one of the set of two or more frequency buckets with a given associated frequency usage range that includes the computed average.

In step 206, a software update notification for the given software update is generated. The given software update notification comprises (i) an indication of a remaining number of deferrals for the given software update and (ii) one or more user interface features for utilizing one of the remaining number of deferrals for the given software update. The remaining number of deferrals comprises a difference between the selected number of allowable deferrals for the given software update and a number of previously-used deferrals for the given software update. The generated software update notification may be provided to the computing instance (e.g., the client device 102-1) and/or an additional computing instance (e.g., one or more other ones of the client devices 102, a separate computing device associated with an authorized user responsible for managing software updates for the client device 102-1, etc.).

OS and other software application updates may be presented in the form of a service running on a user or client device, with the service automating the process of downloading and installing such updates over a network such as the Internet. Such a service, of which the software support system 110 of FIG. 1 is an example, may present notifications to users prior to installing the updates. It should be noted that while various embodiments are described herein with respect to providing such notifications in the form of pop-up notifications or other dialog boxes on the device that is to be updated, this is not a requirement. In some embodiments, software update notifications regarding software running on a first device that is to be updated may, in some cases, be presented to an authorized user (e.g., with the ability to accept or defer such updates) at a second device different than the first device. For example, a user may run an instance of software support system 110 on a desktop computing device that pushes update notifications to a mobile computing device (e.g., a smartphone) of that user. The software update notifications may also be presented to various different users. For example, in an enterprise system containing various physical and/or virtual computing resources running software applications that receive updates, one user or a group of users (e.g., an information technology (IT) administrator or staff) may be responsible for accepting or deferring updates for multiple physical and virtual computing resources within the enterprise system. Various other examples are possible.

Software update notifications may be presented in the form of a pop-up notification or dialog box that prompts the user to install the software updates, often in conjunction with a mandatory restart of the associated physical or virtual computing resource or closure of some number of software applications (e.g., which may include not only the software application to be updated, but also other software applications not being updated that must be closed to successfully apply software updates to the software application being updated) that will be triggered as part of applying the software updates. While the software update notifications may be deferred, the number of deferrals is typically limited such that at some point the notification is presented in the form of a non-deferrable software update notification. In some cases, the number of deferrals may be based at least in part on user attributes (e.g., the type of user account, such as a guest account, an administrator or root account, etc.).

This may cause frustration for users, as such non-deferrable software update notifications may be presented while the users are performing critical tasks and force the users to terminate applications that are in use. In addition, users may continually defer updates for various reasons. For example, users may not be aware of the contents that the software updates carry, the criticality of such updates, and whether either the content or criticality is relevant for a particular user. Consider a situation where a software update notification is presented for a particular software application that a user rarely or never uses. The user in such a situation may continue to defer the software updates for this software application, as it is directed to a rarely or never used software application, until the deferrals run out and the user is forced to restart possibly at an inconvenient time.

Figure 3:
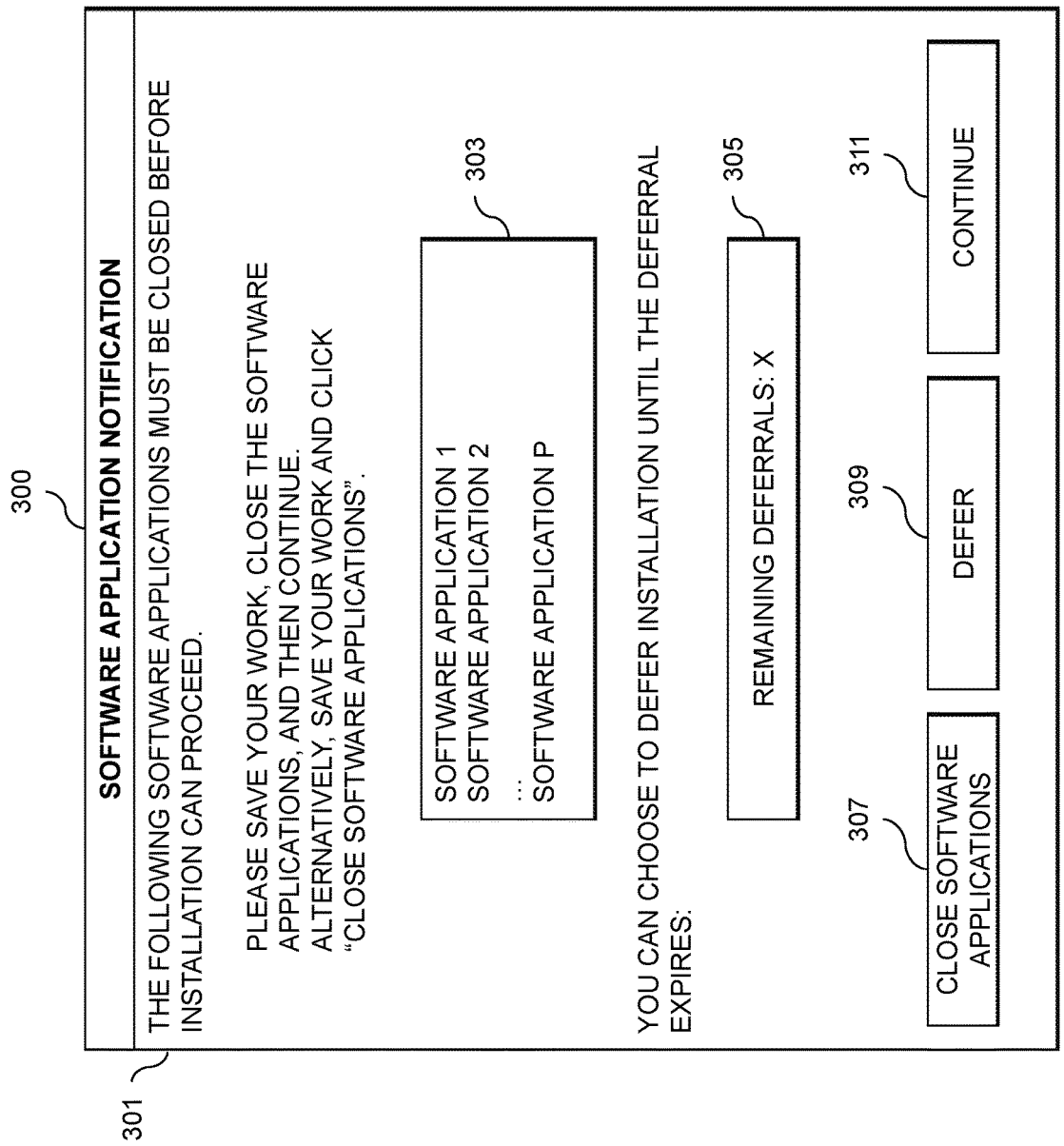
FIG. 3 shows an example of a software update notification in an illustrative embodiment.

FIG. 3 shows an example of a software update notification 300. The software update notification includes a text box 301, indicating information about the software applications 303 that have updates available, along with a warning to save work and close applications before continuing. The text box 301 includes element 303, which lists the software applications 1, 2, . . . P that must be closed before the software updates can be applied (which may include a first software application to be updated, along with various other software applications that may also need to be closed in order to apply the software update to the first software application). The text box 301 also includes an element 305 listing the number of remaining deferrals for the software update notification 300, along with user interface features (e.g., buttons) for closing software applications 307, using one of the remaining deferrals 309, and continuing with the software updates 311.

When software update notifications, such as software update notification 300, are presented to a user, the tendency of the user is to defer the software update notification unless it is critical. A software vendor providing the software application updates may provide a fixed number of possible deferrals for the software update notification for all types of users. As noted above, the users may have different feature usage patterns. For example, some users may use a particular software feature of a software application extensively, while others use that software feature rarely or not at all. Thus, the importance of a software update that affects any particular software feature of a software application will vary for different users. Consider a scenario where a particular software application (e.g., that is running or installed on a physical or virtual computing instance) is used by first and second users, where the first user utilizes the software application on a regular basis while the second user rarely if ever uses the software application. Thus, there are higher chances that the second user would want to keep deferring software update notifications for the software application.

In some embodiments, software agents (e.g., vendor-side agent 124 of software vendor 104-1) are run in a software vendor environment. Such software agents, which may be implemented in the form of thin clients, may be run as part of or in conjunction with a software development and deployment cycle (e.g., vendor development cycle 114 of software vendor 104-1) in the software vendor environment. The software agents in the software vendor environment are illustratively configured to analyze new software application updates for any desired software application upgrade or update launch. At the client side, support software (e.g., software support system 110 of client device 102-1) is illustratively configured to analyze the various software applications installed by particular users, and discover which software features of such software applications are commonly used by different ones or groups of the users. The support software may do so utilizing client-side software agents (e.g., client-side agents 112) which are run as part of or external to the support software. Such client-side software agents, similar to the vendor-side software agents, may be implemented in the form of thin clients.

The vendor-side and client-side software agents may collectively provide information for determining how applicable a particular software update is to a particular client device, or to a particular user or group of users thereof. The applicability of a particular software update may also be referred to as an importance or relevance of a software update. The importance, relevance or applicability of a software update, as described elsewhere herein, may be determined on an individual client device basis, on an individual user basis (e.g., for each user account of a particular client device), for a group of two or more users (e.g., for multiple user accounts of a particular client device), for a group of two or more client devices (e.g., in cases where a same user or group of users utilize multiple client devices, for multiple client devices within an IT infrastructure that is managed by an enterprise), etc. Based at least in part on the determined applicability of a given software update, the software update notifications presented to the users are customized. For example, the number of applicable deferrals may be customized based at least in part on the determined applicability of the software update, where the applicability of the update may for example be based at least in part on usage of the software application to be updated by a particular user, group of users, client device, group of client devices, etc. It should be noted that the customization of software update notifications described herein (e.g., the customization of the number of deferrals thereof) may be an optional feature controlled by a software vendor in case of critical software application updates, software application updates that affect security, etc.

Illustrative processes for dynamically determining the number of deferrals for software update notifications will now be described in the context of the FIG. 1 system, where the vendor-side software agents (e.g., vendor-side agent 124) and client-side software agents (e.g., client-side agent 112) are implemented as thin clients. The thin client running on the vendor side as vendor-side agent 124 may be part of or associated with the vendor development cycle 114 for software application and software application upgrade development. The vendor-side agent 124 may closely analyze changes in new software code that is being made part of a development-ready branch (e.g., production ready update builds 116) of the vendor development cycle 114, as well as changes in test cases 118 and unit tests 120 being updated in the same branch. The deltas of the test cases 118 and unit test 120 help the vendor-side agent 124 to understand the different changes that have been made to the production ready update builds 116 in the vendor development cycle 114. Changes may be in the form of addition of new features, editing or modification of existing features, deletion of existing features, etc. Such changes may be further or alternatively captured in software development logs 122.

The vendor-side agent 124 creates, for one or more particular production ready update builds 126, an associated metadata file or files 128 characterizing such changes. One or more particular production ready update builds 126 and associated metadata files 128 are provided from the vendor-side agent 124 to the software support system 110 of the client device 102-1, which is assumed to be running or have installed thereon a previous version or build of the software application being updated by the production ready update builds 126. The software support system 110 and/or the client-side agents 112 are assumed to be configured to read and understand the metadata files 128 that accompany the production ready update builds 126 provided as part of the software update. The metadata files 128, in some embodiments, include sections characterizing unimpacted features, impacted features (e.g., edited or modified features), newly added features, and deleted features.

Figure 4:
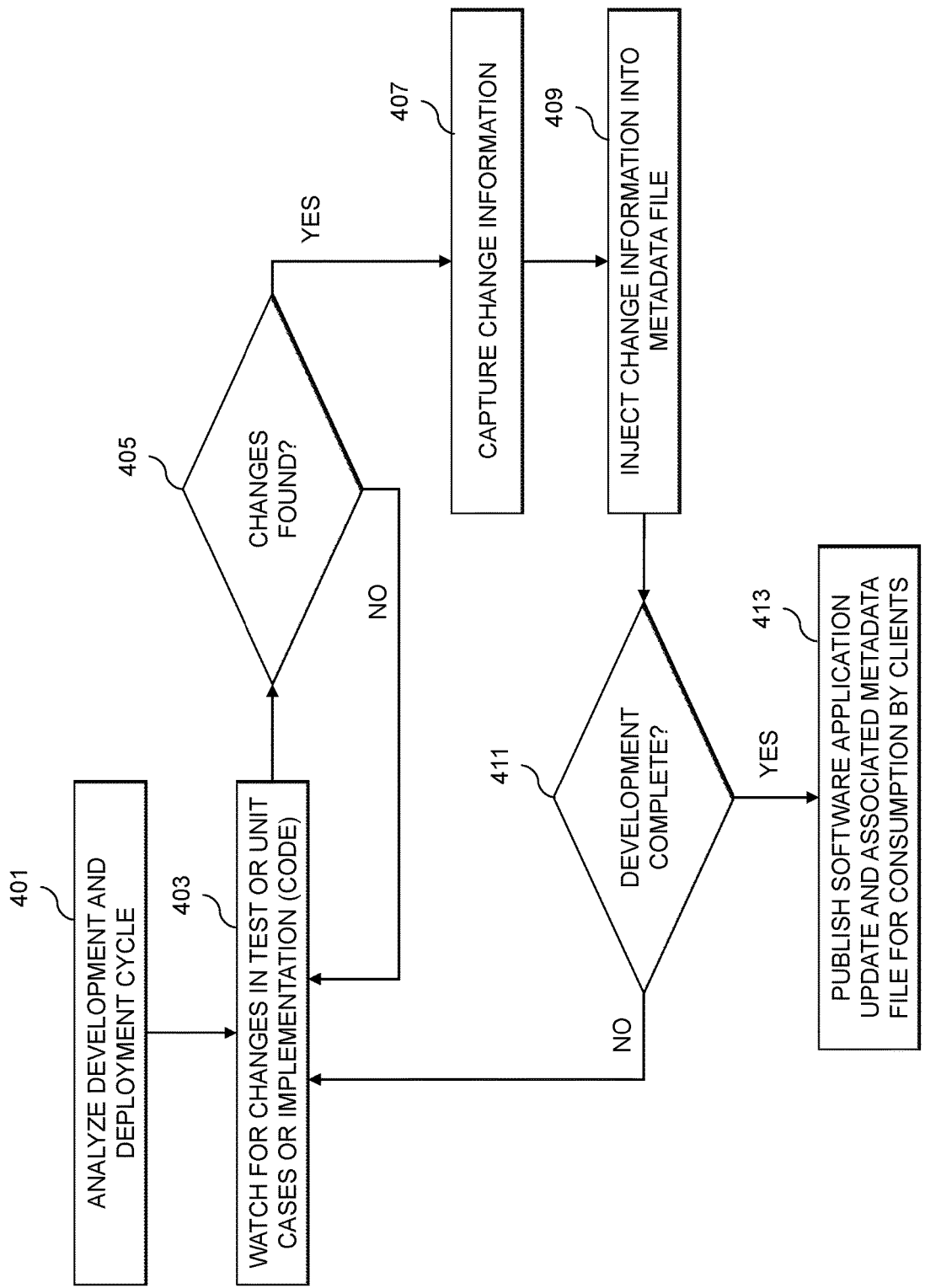
FIG. 4 is a flow diagram of an exemplary process for publishing software update notifications in an illustrative embodiment.

FIG. 4 shows a flow diagram of a process for publishing or otherwise providing software update notifications. In the description below, it is assumed that the FIG. 4 process is performed by the vendor-side agent 124. It should be appreciated, however, that in other embodiments the FIG. 4 process may be performed at least in part by another entity (e.g., another component of a software provider or software vendor, or possibly at least partially internal to a client device running a software support system such as client device 102-1 running software support system 110). In step 401, the vendor-side agent 124 analyzes the development and deployment cycle 114 of the software vendor 104-1. The vendor-side agent 124 in step 403 watches for changes in software code of the production ready update builds 116, the test cases 118, and the unit test 120. Such changes may also be detected by parsing the software development logs 122

In step 405, a determination is made as to whether any changes are found in step 403. If the result of the step 405 determination is no, the FIG. 4 process returns to step 403. If the result of the step 405 determination is yes, the FIG. 4 process captures the change information in step 407. The change information may include, for example, information related to changes in the description of the test cases 118 or unit test 120, logs 122 present in the flow of software development, etc. The change information captured may include information regarding the type of change (e.g., additions, edits or modifications, deletions, etc.). In step 409, the change information is injected into the metadata files 128.

Following step 409, a determination is made as to whether development is complete in step 411. In this context, development being "complete" may refer to the case where a new production ready update build 116 within the vendor development cycle 114 is made available as production ready update build 126 (e.g., that is part of a software update sent to one or more client devices such as client device 102-1). A particular software application may be under constant or continuous development, such that the availability of new production ready update builds does not represent the end of development, but nonetheless may be considered "completion" of a software update that triggers sending of a software update notification. If the result of the step 411 determination is no, the FIG. 4 process returns to step 403. If the result of the step 411 determination is yes, the FIG. 4 process continues with publishing or otherwise making a software update available for consumption by clients in step 413. The software update, as noted above, may include both production ready update build 126 and its associated metadata files 128.

Figure 5:
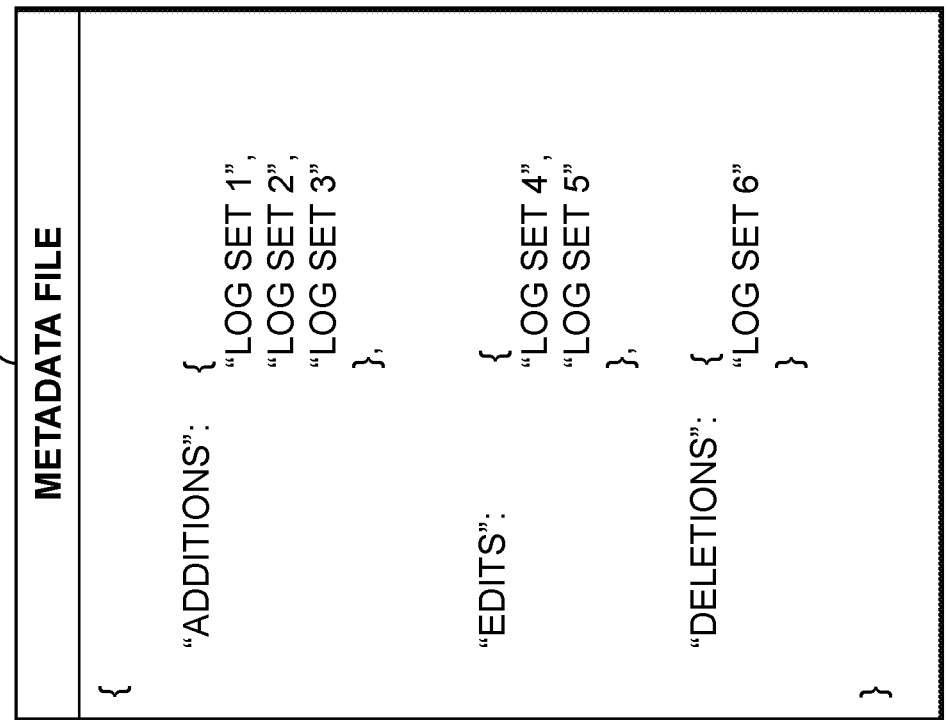
FIG. 5 shows an example of a software update notification metadata file in an illustrative embodiment.

FIG. 5 shows an example structure for a software update notification metadata file 500. In the FIG. 5 example, the metadata file 500 utilizes a JavaScript Object Notation (JSON) format. It should be appreciated, however, that various other formats may be utilized such as an Extensible Markup Language (XML) file format. The software update notification metadata file 500 includes sets of logs that characterize the different changes of an associated production ready update build at the feature level. Each entry in the JSON format of the software update notification metadata file 500 comprises a log set, where a log set is the set of all logs that fall into the specific flow for a feature that underwent change as part of a particular software update. In some embodiments, log sets are used to capture a sequence of steps. For example, there may be cases where a common method is being used in multiple features which would create an ambiguous situation. Log sets may thus be used which take into consideration such factors to avoid such ambiguities. In some cases, logs may be parameterized logs such as "Device is added with Service Tag as % s." Such parameterized logs may be captured as is, assuming that the software support system 110 is configured to compare and fetch the relevant values therefrom.

While FIG. 5 shows an example software update notification metadata file 500 that includes sections for additions, edits or modifications, and deletions, this is not a requirement. In some embodiments, different software update notification metadata files are used for each change type (e.g., there is one metadata file for additions, one metadata file for edits or modifications, one metadata file for deletions, etc.). There may also be a separate metadata file, or a separate section within another metadata file, for unimpacted features.

The thin client running on the customer or client side as client-side agents 112 gives additional capability to the software support system 110 in analyzing which features of software applications are commonly used (e.g., by the client device 102-1 as a whole, by individual ones of groups of users of the client device 102-1, by a set of multiple ones of the client devices 102, etc.). To do so, the client-side agents 112 determine the frequency of particular log sets by scanning the logs generated so far (e.g., such that the software support system 110 gets a count of the logs that correspond to particular features of software applications). The frequency of the log sets may be output as a file or data structure referred to herein as a feature usage list, which contains information characterizing the frequency of different log sets. The feature usage list, similar to the metadata files 128 described above, may be in a JSON, XML or another suitable file format. In some embodiments, the feature usage list includes log set numbers and their associated frequencies of occurrence as fetched from logs of software applications currently in use by the client device 102-1. In some embodiments, the feature usage lists characterize logs captured over some designated period of time. The designated period of time for a particular software application may be the total time since the last update for that software application. The designated period of time may alternatively be a most recent X minutes, hours, days, weeks, etc. The designated period of time may be a user-configurable parameter.

Figure 6:
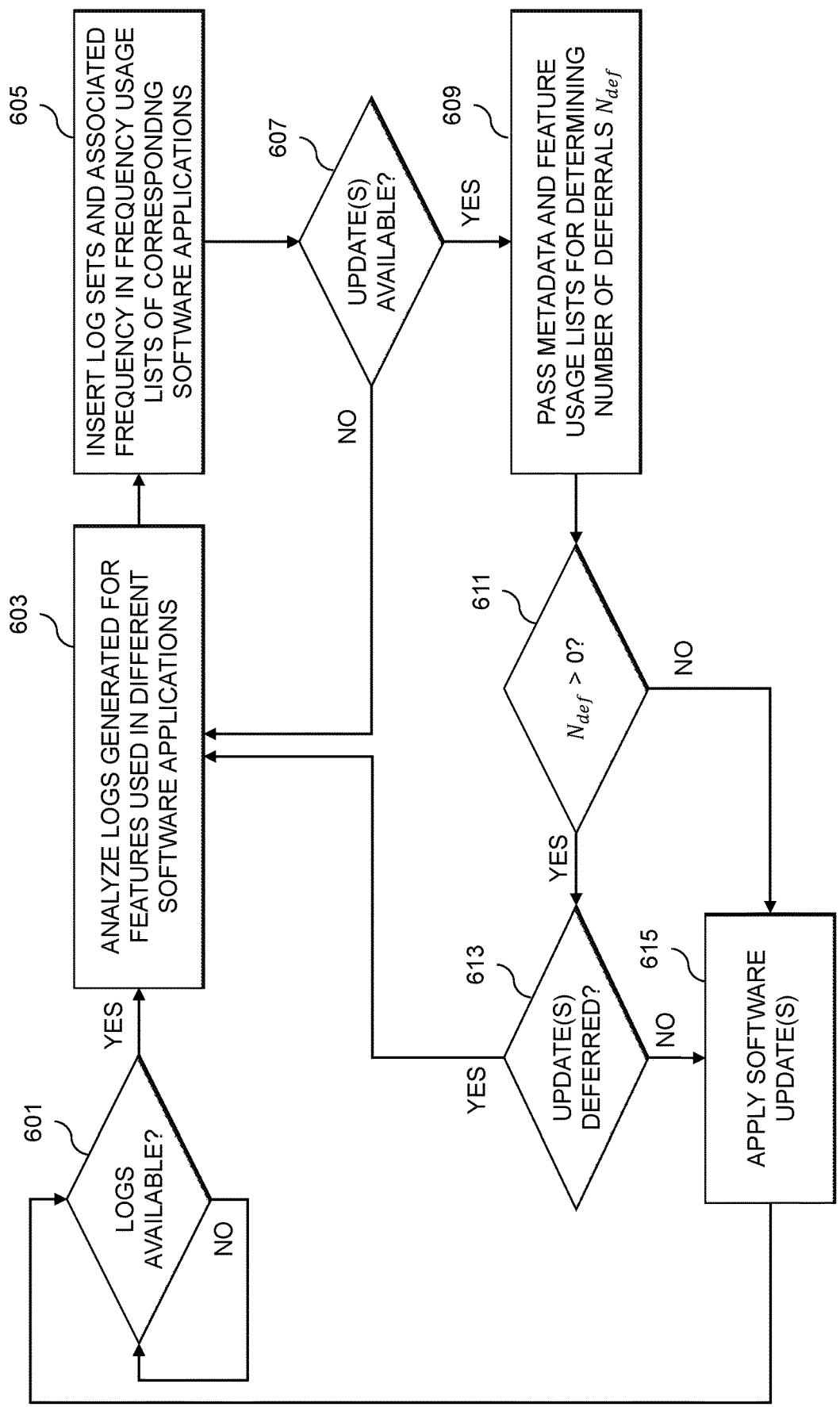
FIG. 6 is a flow diagram of an exemplary process for determining usage characteristics for software applications in an illustrative embodiment.

FIG. 6 shows a flow diagram of a process for determining usage characteristics for software applications. In the description below, it is assumed that the FIG. 6 process is performed by the client-side agents 112. It should be appreciated, however, that in other embodiments the FIG. 6 process may be performed at least in part by another entity (e.g., the software support system 110 or another component of the client device 102-1). In step 601, the client-side agents 112 determine whether application logs are available. When the result of the step 601 determination is yes, the client-side agents 112 analyze the generated logs for features that are used for different installed software applications of the client device 102-1 in step 603.

In step 605, log sets and their associated frequencies are inserted into frequency usage lists for corresponding software applications. A determination is made in step 607 as to whether software updates are available (e.g., for installed software applications of the client device 102-1). If the result of the step 607 determination is no, the FIG. 6 process returns to step 603. If the result of the step 607 determination is yes, the feature usage list(s) for the software application(s) having available software updates are passed, along with software update notification metadata files 128, for determining a number of deferrals, $N_{def}$, in step 609. Details regarding determination of $N_{def}$ values will be provided below in the context of FIGS. 7A-7C. As described in further detail below step 609 and subsequent steps in some embodiments may be performed individually and in parallel for each software application that has a software update available. In other embodiments, a single instance of step 609 and subsequent steps may be performed for multiple software applications that have updates available.

Continuing with the FIG. 6 process, a determination is made in step 611 as to whether $N_{def}$ is greater than 0. If the result of the step 611 determination is yes, a determination is made as to whether the software update has been deferred, in step 613. If the result of either the step 611 determination or the step 613 determination is no, the FIG. 6 process applies the software update in step 615. It should be noted that this allows for dynamic updating of the calculation of the number of deferrals in step 609 to capture changes in usage patterns during time periods where the software updates have been deferred. In this way, the optimal or customized number of deferrals may be dynamically updated in real time. Following step 615, the FIG. 6 process may then return to step 601. If the result of the step 613 determination is yes, the FIG. 6 process returns to step 603.

In the FIG. 6 process, there may be multiple software applications that have updates available in the step 607 determination. As noted above, in some embodiments, steps 609 through 615 may be performed separately for each software application that has a software update available. For example, a separate $N_{def}$ value may be calculated for each such software application with an update available. Different software update notifications may be presented for each of the software applications that have a software update available. Alternatively, a single software update notification may be presented for multiple software applications that have software updates available. The single software update notification may provide separate interface features for deferring the software update for the different software applications that have software updates available. In other words, the single software update notification may make deferrals available to a user on a per-software application basis such that the user can choose to defer some, none or all of the software updates.

Consider, for example, a case where a first software application has a first $N_{def}$ value and a second software application has a second $N_{def}$ value different than the first $N_{def}$ value. In such a case, the user may be able to individually defer the software updates for the first and second software applications based at least in part on the first and second $N_{def}$ values (e.g., the remaining numbers of deferrals for the first and second software applications). Making the number of deferrals available on a per-software application basis may be particularly useful in cases where installing the software updates for different applications do not affect one another. Continuing with the above example, assume that installing the software update for the first software application does not affect the second software application (e.g., it does not require the second software application to be closed or the associated client device to be restarted). If, however, installing the software updates for different applications will affect one another, it may not be desired to make the number of deferrals available on a per-software application basis. Continuing again with the above example, assume that installing the software update for the first software application does affect the second software application (e.g., it requires the second software application to be closed or the associated client device to be restarted). In such a case, the number of deferrals made available to the user may be a smallest one of the first and second $N_{def}$ values (or, more generally, the smallest $N_{def}$ value across the software applications with updates available that affect one another), an average or other combination of the first and second $N_{def}$ values, etc.

Figure 7A:
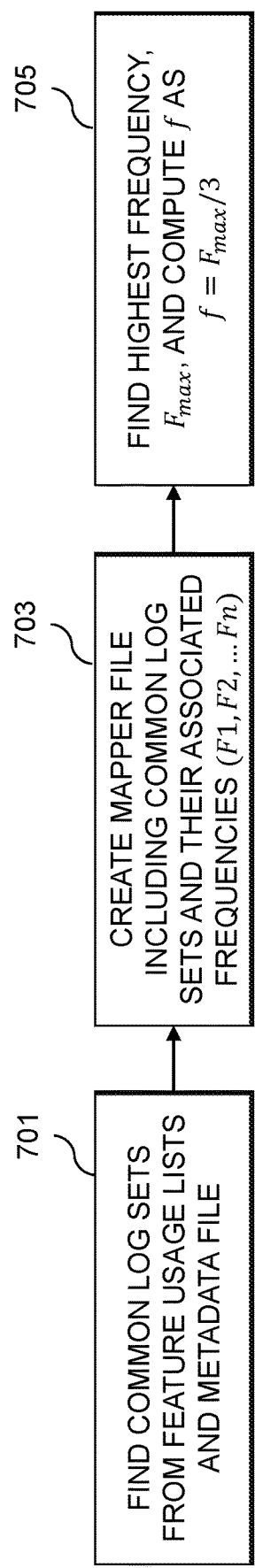
FIGS. 7A-7C are flow diagrams of exemplary processes for determining a number of deferrals for a software update notification in an illustrative embodiment.
Figure 7B:
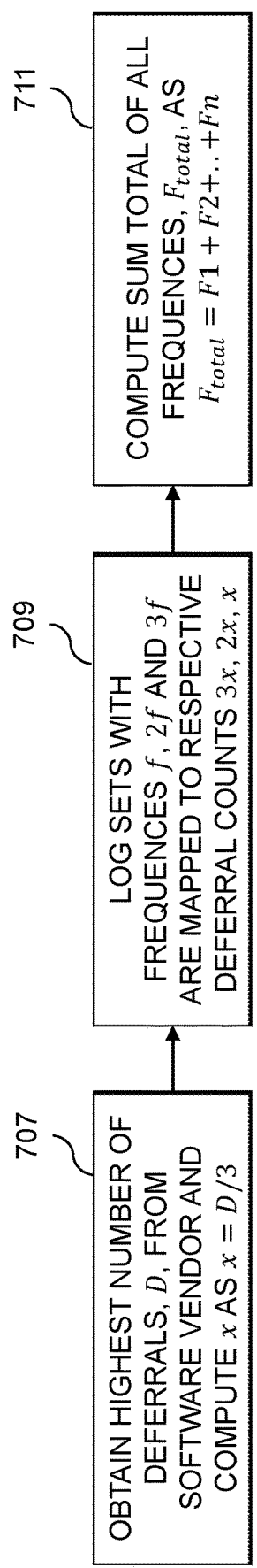
Figure 7C:
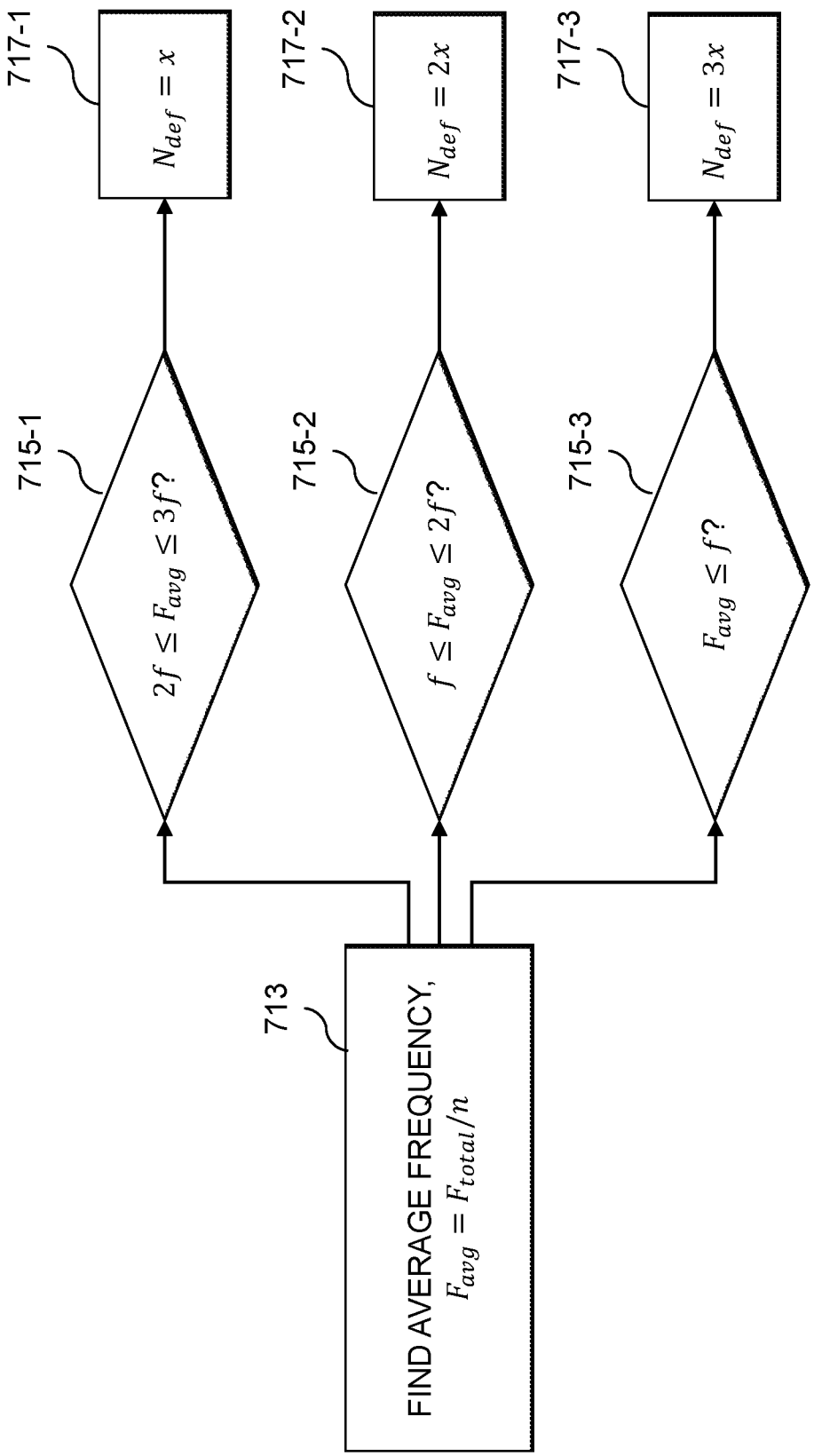

Processes for determining the number of deferrals for a software update notification will now be described with respect to FIGS. 7A-7C. FIG. 7A shows a process for computing values used for determining the boundaries of frequency "buckets" where each bucket is associated with a different number of allowed deferrals. FIG. 7B shows a process for mapping the deferral counts to the different buckets and for computing the sum of all frequencies across features in a feature usage list. FIG. 7C shows a process for mapping an average frequency across features in a feature usage list to one of the different buckets and its associated deferral count.

The FIG. 7A process begins in step 701, with fetching log sets from (i) the feature usage list for a particular software application and (ii) the software update notification metadata file or files 128 associated with a production ready update build 126 for that software application. Once such log sets are fetched or otherwise obtained, they are mapped to find common log sets. In step 703, a mapper file is created that includes the common log sets and their associated frequencies. The frequencies for the common log sets 1, 2, . . . n are denoted F1, F2, . . . Fn. The highest frequency from the frequencies of the common log sets F1, F2, . . . Fn is found and denoted $F_{max}$. A value f is then determined in step 705, where the value f is used in determining boundaries for the different frequency buckets. In the description below, it is assumed that three frequency buckets are used, though it should be appreciated that other numbers of frequency buckets may be used as desired. Where three frequency buckets are used, the value f is computed as $f=F_{max}/3$. More generally, f may be computed as $f=F_{max}/B$, where B represents the number of frequency buckets.

The FIG. 7B process begins in step 707, with obtaining the highest number of deferrals, denoted D, from a software vendor providing the software update. The value D is used for computing a value x used to map frequency boundary values for the different frequency buckets to particular numbers of deferrals. Continuing the above example with three frequency buckets, x=D/3. More generally, x may be computed as x=D/B. In step 709, log sets with frequencies of f, 2f and 3f are mapped to respective deferral counts 3x, 2x and x. This is for the example where the number of frequency buckets is three. More generally, log sets with frequencies of f, 2f, . . . (B−1)f, Bf are mapped to respective deferral counts Bf, (B−1)f, . . . 2f, f. In step 711, the sum total of all the frequencies for the common log sets is computed as $F_{total}=F1+F2+ \ldots +Fn$.

The FIG. 7C process begins with step 713, finding the average frequency for the common log sets as $F_{avg}=F_{total}/n$. $F_{avg}$ is then used to map between different frequency buckets in determination blocks 715-1, 715-2 and 715-3 (collectively, determination blocks 715). While FIG. 7C shows three determination blocks 715 because the number of frequency buckets is assumed to be three, if more or fewer than three frequency buckets are used there will be more or fewer determination blocks 715. More generally, there will be B determination blocks 715. In the FIG. 7C example, if $2f \leq F_{avg} \leq 3f$ in determination block 715-1, then $N_{def}=x$ in block 717-1. If $f \leq F_{avg} \leq 2f$ in determination block 715-2, then $N_{def}=2x$ in block 717-2. If $F_{avg} \leq f$ in determination block 715-3, then $N_{def}=3x$ in block 717-3.

Although in the FIG. 7C embodiment the average frequency for the common log sets is used to map to a particular frequency bucket, embodiments are not so limited. In some embodiments, a weighted average is computed, where weights are assigned to the different common log sets. The weights may be assigned by a user to characterize the relative importance or other characteristics of different features of the software application represented by the common log sets. The weights may also be based at least in part on the types of changes for features (e.g., different weights may be assigned for added, edited and deleted features). In still other embodiments, a median frequency or other value is used instead of an average or weighted average frequency.

Figure 8A:
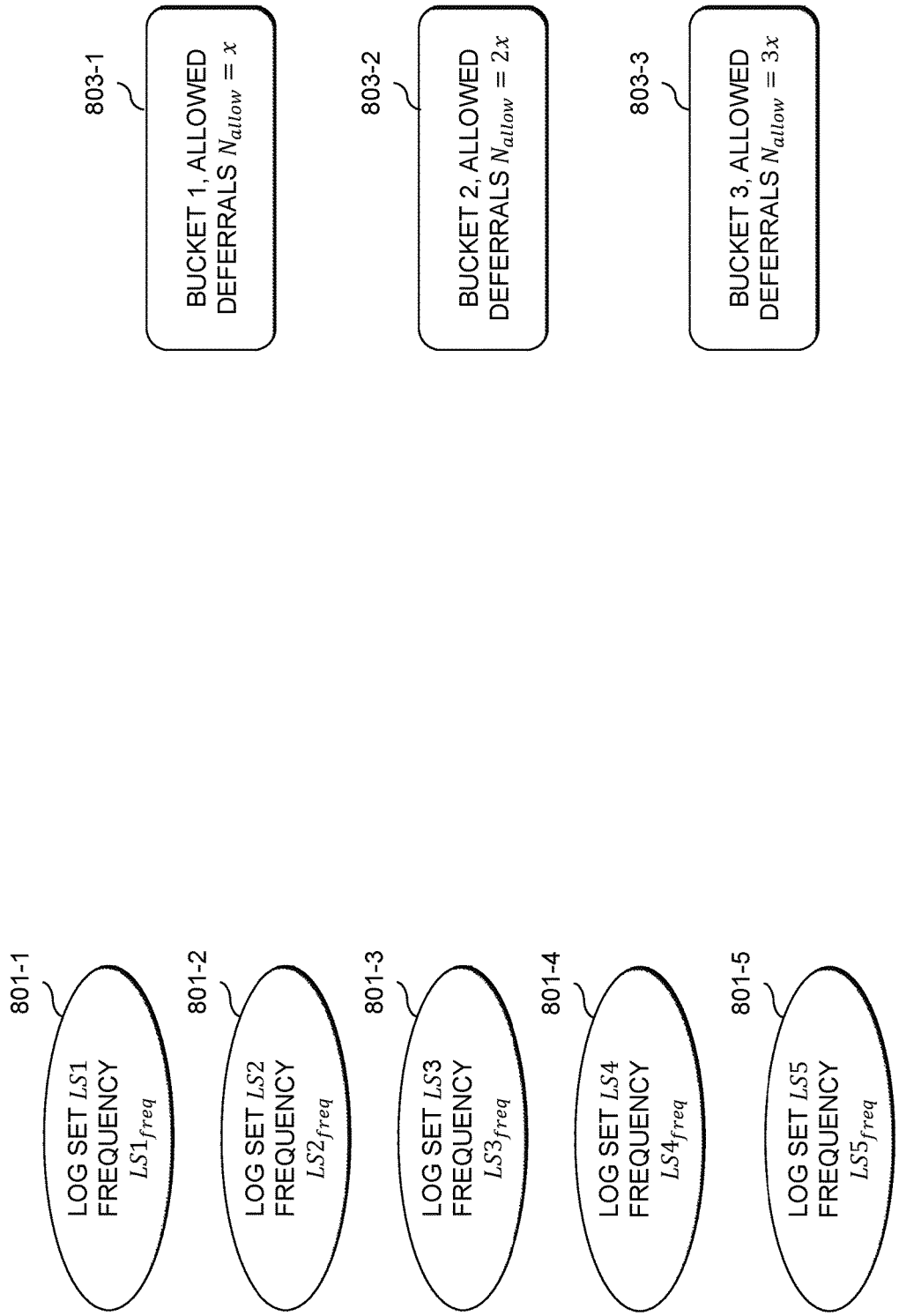
FIGS. 8A-8D show an example calculation of a number of deferrals for a software update notification in an illustrative embodiment.

An example calculation of the number of deferrals for a software update notification using the FIG. 7A-7C processes will now be described with respect to FIGS. 8A-8D. To calculate the number of deferrals, two inputs are utilized as shown in FIG. 8A. The first input is the frequency distribution of the common log sets (e.g., the log sets obtained after mapping the feature usage list and software update notification metadata files as described above with respect to step 703 in the FIG. 7A process). FIG. 8A shows log set frequencies 801-1 through 801-5 (collectively, log set frequencies 801). The log set LS1 frequency 801-1 is denoted $LS1_{freq}$, the log set LS2 frequency 801-2 is denoted $LS2_{freq}$, etc.

The second input is the maximum number of deferrals D, which is assumed to be obtained from a software vendor as described above with respect to step 707 in the FIG. 7B process. It should be noted, however, that the value of D may be overridden by a user if desired to a higher or lower value in some embodiments (e.g., the user may specify a maximum number of deferrals that is greater than or less than the maximum number of deferrals specified by the software vendor). It is preferable in most cases, however, to use the value D provided by the software vendor or to limit the user to specifying a lower value than that provided by the software vendor (e.g., so that the user does not specify an arbitrarily high maximum number of deferrals permitting prolonged or essentially unlimited deferral of software updates). The maximum number of permitted deferrals is further sub-divided into three deferral units (for the three frequency buckets) 803-1, 803-2 and 803-3 (collectively, deferral units or frequency buckets 803) having respective allowed deferral values $N_{allow}=x$, $N_{allow}=2x$, and $N_{allow}=3x$.

Figure 8B:
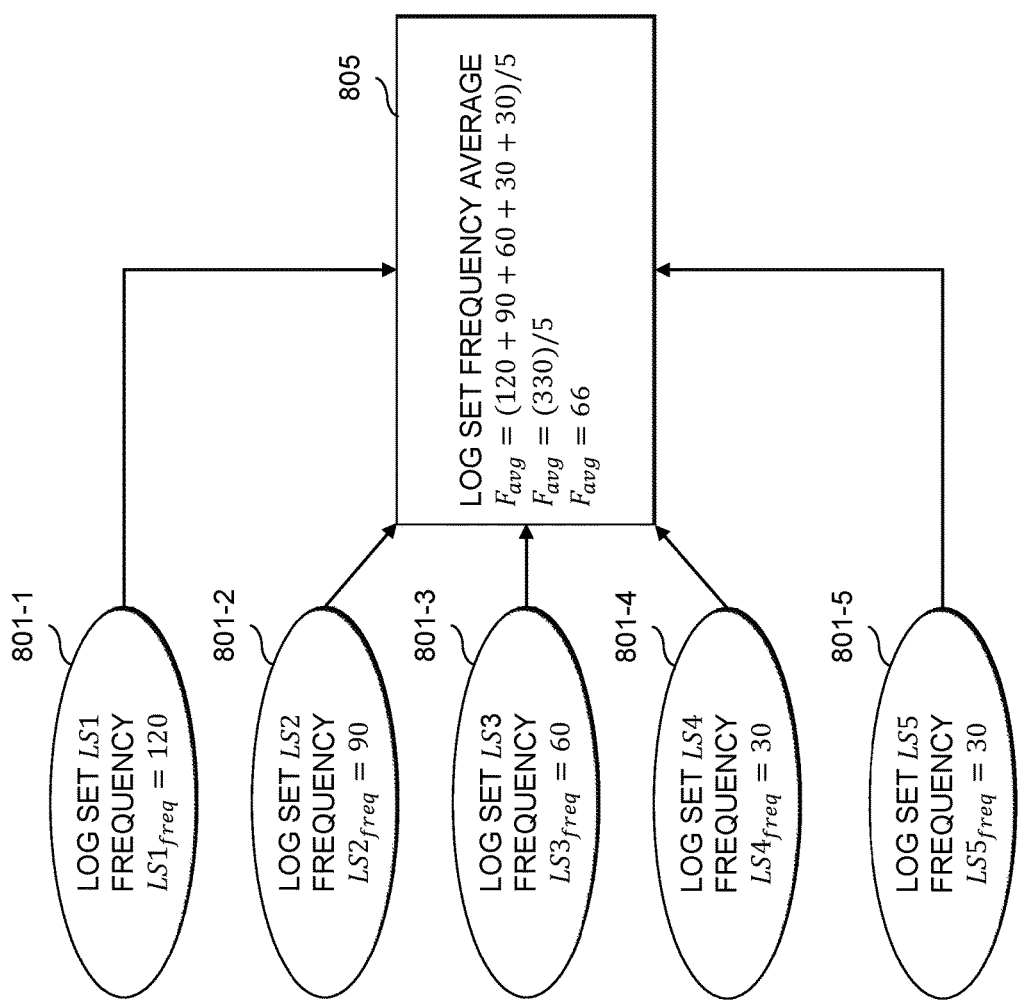

FIG. 8B shows computation 805 of the average frequency or $F_{avg}$ for the log sets frequencies 801. With $LS1_{freq}=120$, $LS2_{freq}=90$, $LS3_{freq}=60$, $LS4_{freq}=30$, and $LS5_{freq}=30$, $F_{avg}=(120+90+60+30+30)/5=(330)/5=66$.

Figure 8C:
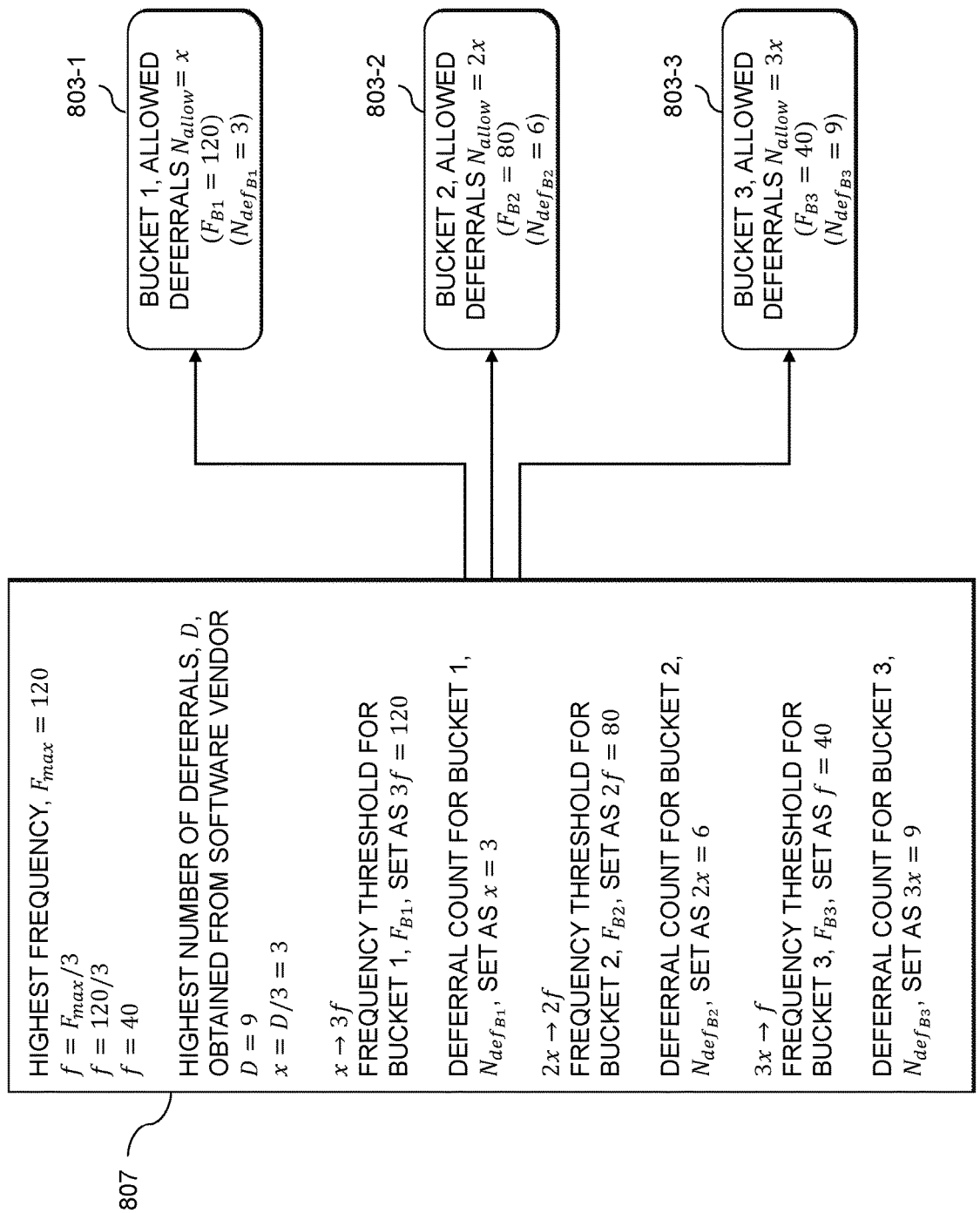

FIG. 8C illustrates computation 807 of the frequency boundary values for moving into the different frequency buckets 803. First, the highest frequency from the frequency distribution of log set frequencies 801, $F_{max}$, is determined. In this example, $F_{max}=120$. Given this, the value f is computed as $f=F_{max}/3=120/3=40$, as there are three frequency buckets. Given the value D=9, x is computed as x=D/3=3. The frequency buckets 803 are then mapped to x→3f, 2x→2f, and 3x→f. The frequency threshold for frequency bucket 803-1, $F_{B1}$, is set as 3f=120. the deferral count for frequency bucket 803-1, $N_{def_{B1}}$, is set as x=3. The frequency threshold for frequency bucket 803-2, $F_{B2}$, set as 2f=80. the deferral count for frequency bucket 803-2, $N_{def_{B2}}$, is set as 2x=6. The frequency threshold for frequency bucket 803-3, $F_{B3}$, is set as f=40. The deferral count for frequency bucket 3, $N_{def_{B3}}$, is set as 3x=9.

Figure 8D:
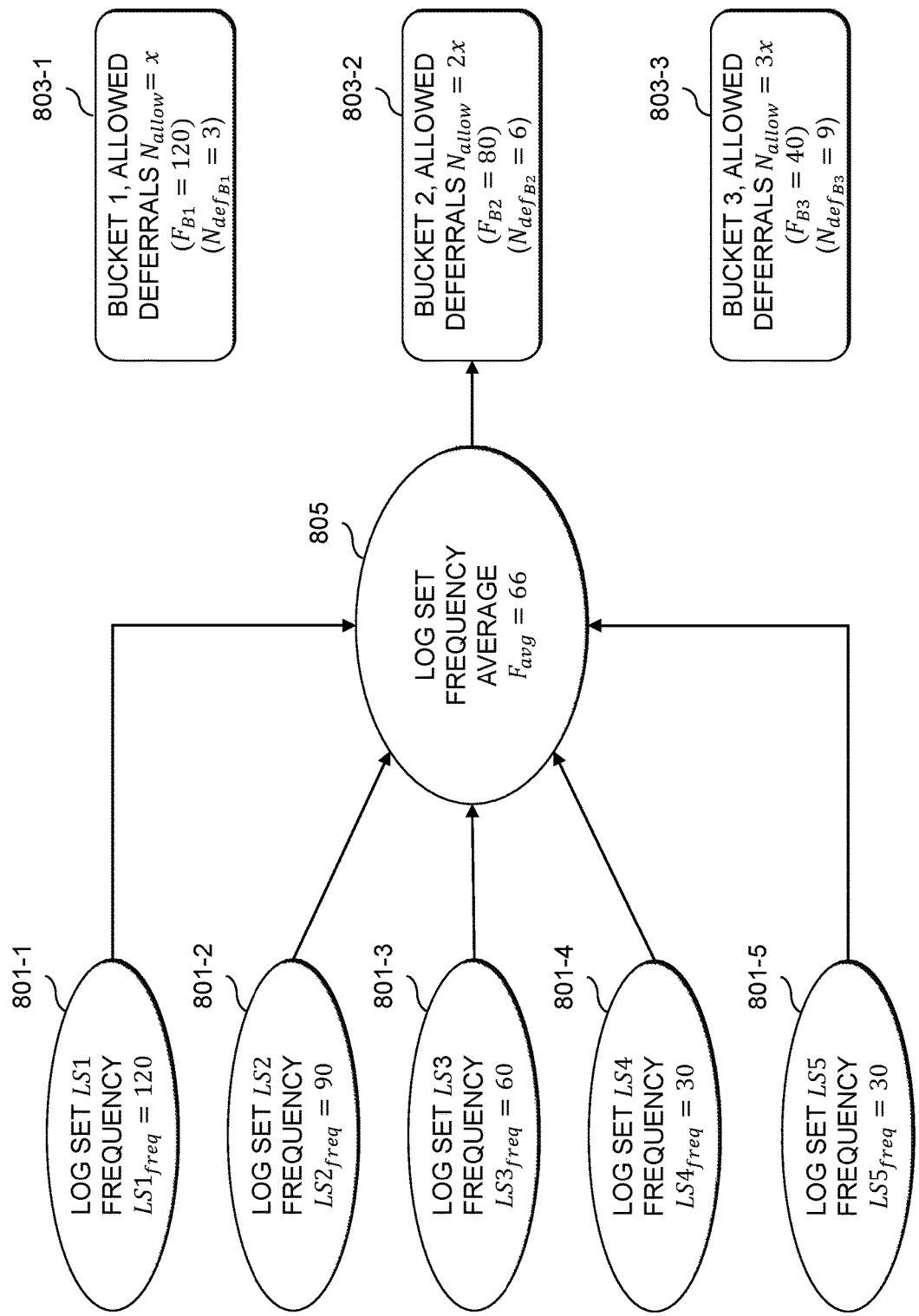

FIG. 8D illustrates how the log set frequency average from computation 805 is mapped to one of the frequency buckets 803. If $80 \leq F_{avg} \leq 120$, the frequency bucket 803-1 is used. If $40 \leq F_{avg} \leq 80$, the frequency bucket 803-2 is used. If $F_{avg} \leq 40$, the frequency bucket 803-3 is used. In this example, $F_{avg}=66$, which maps to frequency bucket 803-2 and thus the permitted number of deferrals would be 6.

Illustrative embodiments provide a number of advantages relative to conventional techniques for managing software updates. For example, conventional techniques for managing software updates typically have a fixed number of deferrals that are allowed as part of any upgrade or other update of software applications. Illustrative embodiments, however, provide users with customized numbers of deferrals which may be based at least in part on usage of features of software applications to be updated. In some embodiments, the functionality for providing customized numbers of deferrals is made available as part of an existing software support or management system of a client device, or as a plugin or add-on to such existing software support or management systems.

Advantageously, illustrative embodiments provide techniques for finding an optimal number of deferrals for a software update that users should be provided with. The optimal number of deferrals is based at least in part on analyzing and considering the criticality of software applications to be updated to a particular user, group of users, client device or group of client devices. The optimal or customized number of deferrals, as described elsewhere herein, may be dynamically updated in real-time as usage of the software applications to be updated changes. The techniques for managing software updates described herein may illustratively be used for supervising a software support system in a user's environment until the software updates are applied. This advantageously provides handling for cases where users change their usage patterns for software applications after deferring software updates (e.g., such that the optimal or customized number of deferrals is dynamically updated in real time).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating software update notifications with customized numbers of deferrals will now be described in greater detail with reference to FIGS. 9 and 10. Although described in the context of system 100, these platforms may also be used to implement at least portions of other information processing systems in other embodiments.

Figure 9:
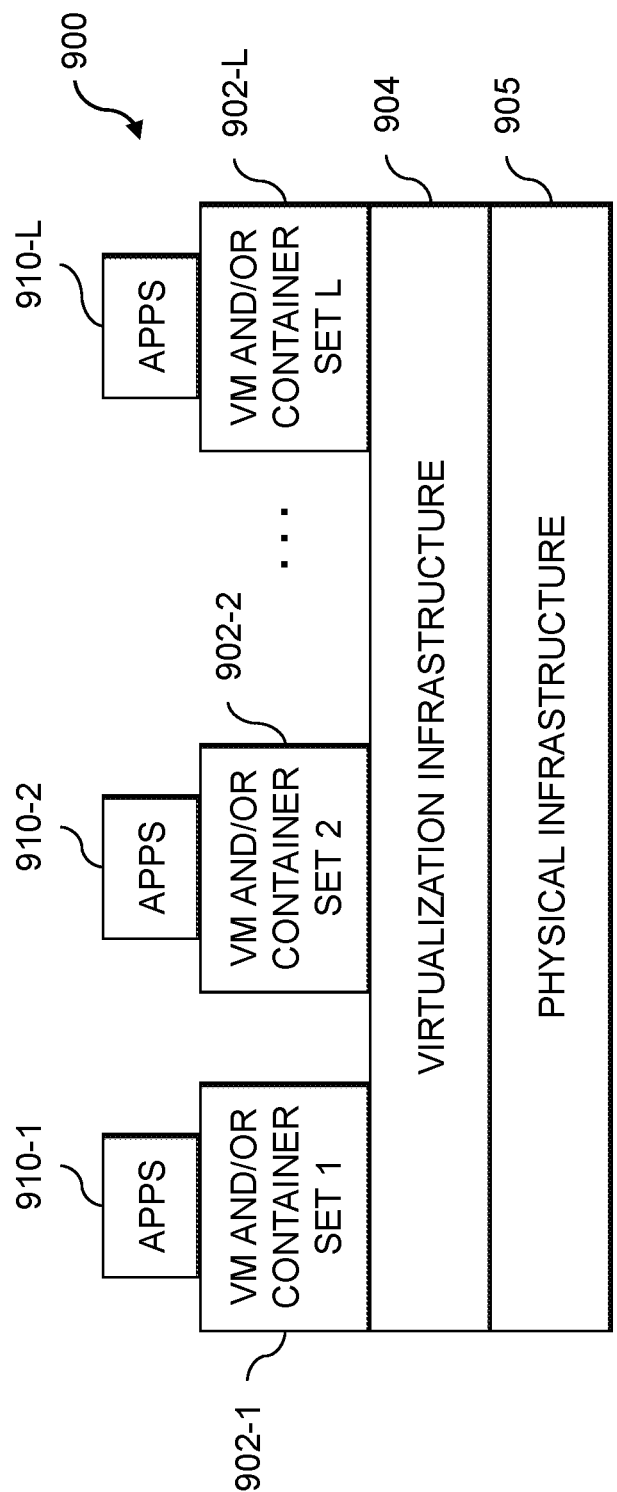
FIGS. 9 and 10 show examples of processing platforms that may be utilized to implement at least a portion of an information processing system in illustrative embodiments.
Figure 10:
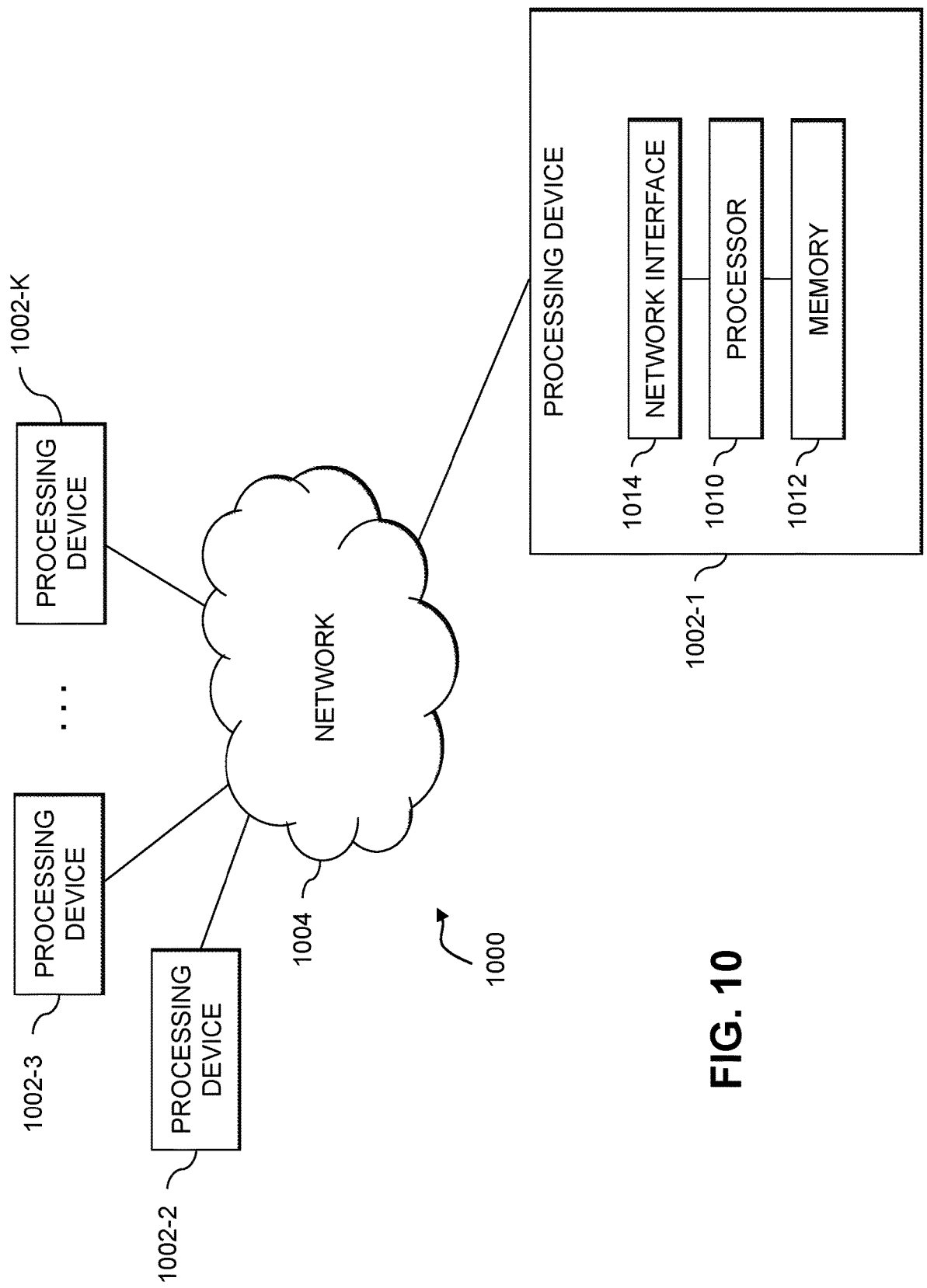

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating software update notifications with customized numbers of deferrals as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, software support systems, software applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   identifying one or more software updates available for one or more software applications installed on a computing resource, at least a given one of the one or more software updates for a given one of the one or more software applications comprising information characterizing one or more features of the given software application affected by the given software update;
   determining one or more frequencies of usage of the one or more features of the given software application affected by the given software update;
   selecting a number of allowable deferrals for the given software update based at least in part on the information characterizing the one or more features of the given software application affected by the given software update and the determined one or more frequencies of usage of the one or more features of the given software application affected by the given software update; and
   generating a software update notification for the given software update, the given software update notification comprising an indication of a remaining number of deferrals for the given software update, the remaining number of deferrals comprising a difference between the selected number of allowable deferrals for the given software update and a number of previously-used deferrals for the given software update.

2. The apparatus of claim 1 wherein the computing resource comprises at least one of a physical computing resource and virtual computing resource.

3. The apparatus of claim 1 wherein the given software application comprises at least a portion of an operating system of the computing resource.

4. The apparatus of claim 1 wherein the information characterizing the one or more features of the given software application affected by the given software update comprises information identifying at least one of:
   one or more newly-added features for the given software application;
   one or more existing features of the given software application modified by the given software update; and
   one or more existing features of the given software application deleted by the given software update.

5. The apparatus of claim 1 wherein determining the one or more frequencies of usage of the one or more features of the given software application affected by the given software update comprises analyzing usage of the given software application by the computing resource.

6. The apparatus of claim 1 wherein determining the one or more frequencies of usage of the one or more features of the given software application affected by the given software update comprises analyzing usage of the given software application by one or more users of the computing resource.

7. The apparatus of claim 1 wherein determining the one or more frequencies of usage of the one or more features of the given software application affected by the given software update comprises analyzing usage of the given software application by one or more users of the computing resource and one or more additional computing resources.

8. The apparatus of claim 1 wherein selecting the number of allowable deferrals for the given software update comprises selecting from amongst a set of two or more frequency buckets each associated with a different number of allowable deferrals.

9. The apparatus of claim 8 wherein a given number of allowable deferrals associated with a given one of the set of two or more frequency buckets is based at least in part on a maximum number of allowable deferrals specified by a software vendor providing the given software update for the given software application.

10. The apparatus of claim 8 wherein each of the set of two or more frequency buckets is associated with a different frequency usage range.

11. The apparatus of claim 10 wherein selecting from amongst the set of two or more frequency buckets comprises mapping the determined one or more frequencies of usage of the one or more features of the given software application affected by the given software update to one of the set of two or more frequency buckets.

12. The apparatus of claim 11 wherein mapping the determined one or more frequencies of usage of the one or more features of the given software application affected by the given software update to one of the set of frequency buckets comprises computing an average of the determined one or more frequencies of usage of the one or more features of the given software application affected by the given software update and selecting a given one of the set of two or more frequency buckets with a given associated frequency usage range that includes the computed average.

13. The apparatus of claim 1 wherein the at least one processing device is further configured to perform the step of providing the generated software update notification to the computing instance, the generated software update notification further comprising one or more user interface features for utilizing one of the remaining number of deferrals for the given software update.

14. The apparatus of claim 1 wherein the at least one processing device is further configured to perform the step of providing the generated software update notification to an additional computing instance, the generated software update notification further comprising one or more user interface features for utilizing one of the remaining number of deferrals for the given software update.

15. A computer program product comprising a non-transitory processor-readable storage medium having stored therein program code of one or more software programs, wherein the program code when executed by at least one processing device causes the at least one processing device to perform steps of:
   identifying one or more software updates available for one or more software applications installed on a computing resource, at least a given one of the one or more software updates for a given one of the one or more software applications comprising information characterizing one or more features of the given software application affected by the given software update;

determining one or more frequencies of usage of the one or more features of the given software application affected by the given software update;

selecting a number of allowable deferrals for the given software update based at least in part on the information characterizing the one or more features of the given software application affected by the given software update and the determined one or more frequencies of usage of the one or more features of the given software application affected by the given software update; and generating a software update notification for the given software update, the given software update notification comprising an indication of a remaining number of deferrals for the given software update, the remaining number of deferrals comprising a difference between the selected number of allowable deferrals for the given software update and a number of previously-used deferrals for the given software update.

16. The computer program product of claim 15 wherein selecting the number of allowable deferrals for the given software update comprises selecting from amongst a set of two or more frequency buckets each associated with a different number of allowable deferrals, each of the set of two or more frequency buckets being associated with a different frequency usage range.

17. The computer program product of claim 16 wherein selecting from amongst the set of two or more frequency buckets comprises mapping the determined one or more frequencies of usage of the one or more features of the given software application affected by the given software update to one of the set of two or more frequency buckets by computing an average of the determined one or more frequencies of usage of the one or more features of the given software application affected by the given software update and selecting a given one of the set of two or more frequency buckets with a given associated frequency usage range that includes the computed average.

18. A method comprising:
identifying one or more software updates available for one or more software applications installed on a computing resource, at least a given one of the one or more software updates for a given one of the one or more software applications comprising information characterizing one or more features of the given software application affected by the given software update;

determining one or more frequencies of usage of the one or more features of the given software application affected by the given software update;

selecting a number of allowable deferrals for the given software update based at least in part on the information characterizing the one or more features of the given software application affected by the given software update and the determined one or more frequencies of usage of the one or more features of the given software application affected by the given software update; and generating a software update notification for the given software update, the given software update notification comprising an indication of a remaining number of deferrals for the given software update, the remaining number of deferrals comprising a difference between the selected number of allowable deferrals for the given software update and a number of previously-used deferrals for the given software update;

wherein the method is performed by at least one processing device comprising a processor coupled to a memory.

19. The method of claim 18 wherein selecting the number of allowable deferrals for the given software update comprises selecting from amongst a set of two or more frequency buckets each associated with a different number of allowable deferrals, each of the set of two or more frequency buckets being associated with a different frequency usage range.

20. The method of claim 19 wherein selecting from amongst the set of two or more frequency buckets comprises mapping the determined one or more frequencies of usage of the one or more features of the given software application affected by the given software update to one of the set of two or more frequency buckets by computing an average of the determined one or more frequencies of usage of the one or more features of the given software application affected by the given software update and selecting a given one of the set of two or more frequency buckets with a given associated frequency usage range that includes the computed average.

* * * * *